3,138,241
GLASS PRESS MOLD TURRET
Frederick A. Dahlman, Corning, N.Y., assignor to Corning Glass Works, Corning, N.Y., a corporation of New York
Filed Oct. 23, 1962, Ser. No. 232,454
8 Claims. (Cl. 198—209)

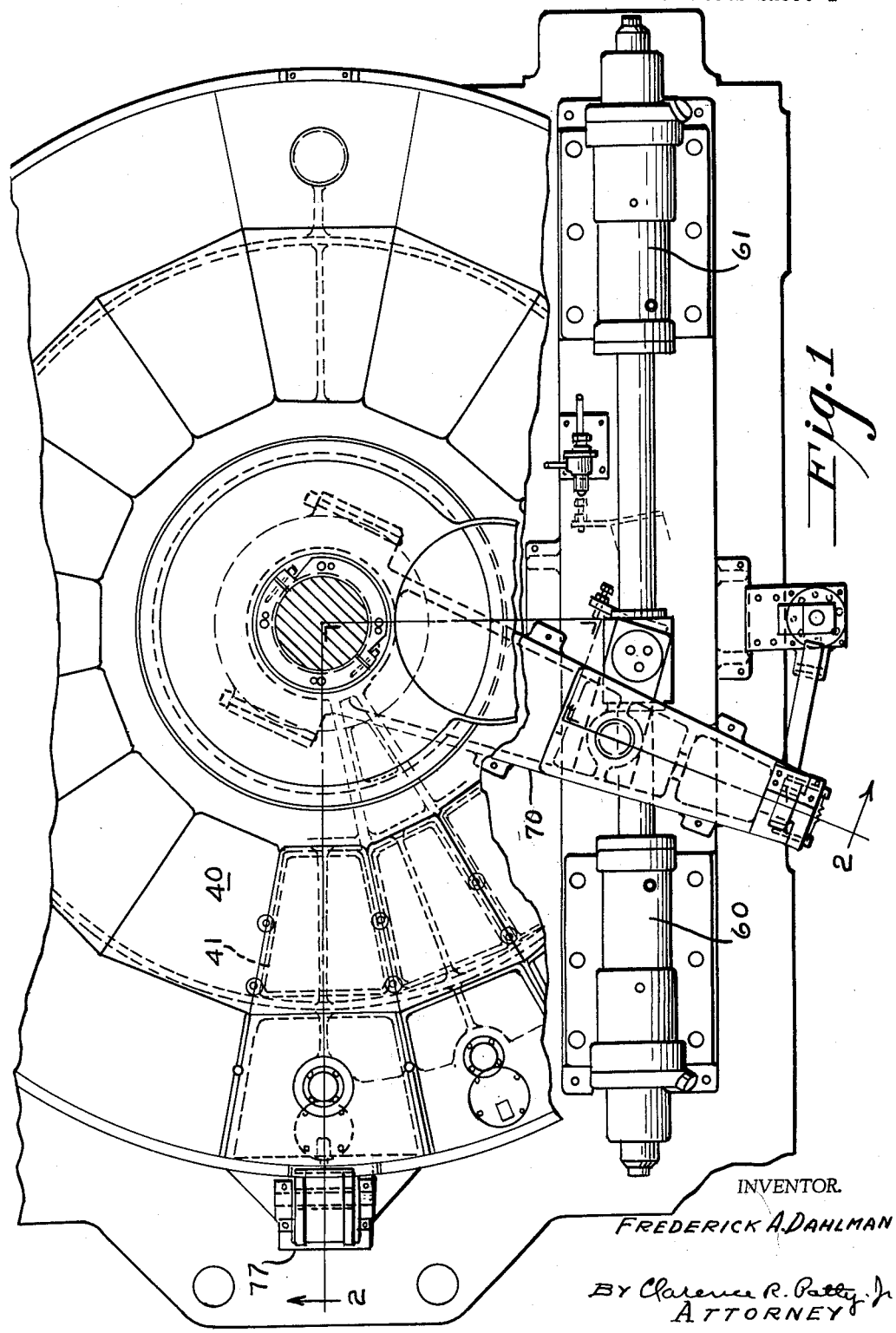

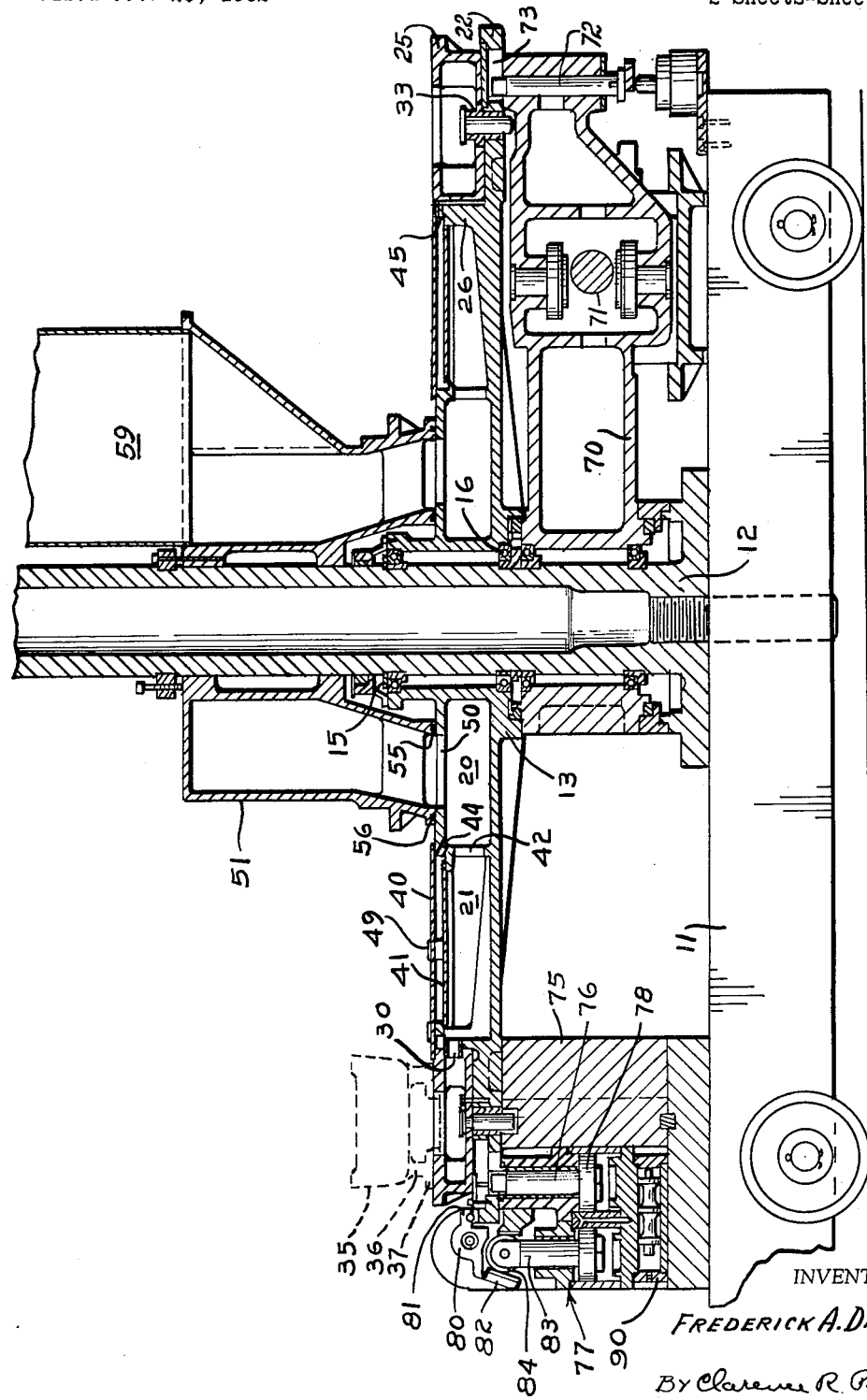

The present invention relates to turret-type glass pressing machines and is particularly concerned with the provision of a turret for such form of machine designed to convey glass forming molds and present them to various operational positions of a press of which it forms a part.

In conventional glass pressing machines the turret usually embodies a solid cast iron top which soaks up heat radiated from the glass forming molds. As a consequence, size changes occur in the turret, setting up strains therein that often result in crowning and other forms of warpage so that a mold carried by it may not remain plumb with respect to a press head; and, although the turret may be prevented from rocking during a pressing operation by clamping it to an anvil at the pressing station, such clamping is of no help in correcting an out-of-plumb condition created by warping or crowning. Moreover, the dimensional changes are likely to cause vertical misalignment of the pressing plunger and mold, resulting in the pressing of articles whose side walls lack uniformity in thickness about their periphery.

According to the invention, the commonly employed cast iron turret top has been replaced by a double wall structure in part embodying reflecting and insulating type of heat shields between which air is passed to dissipate heat radiated from the hot glass forming molds and which in a conventional structure is "soaked up" by it. The shields are attached in a floating manner that permits them to expand freely and they, therefore, cannot set up strains in the turret structure. Under such conditions, temperature changes of the turret are substantially restricted to those relatively minor ones resulting from changes in ambient temperature. To limit the temperature changes in the turret to an absolute minimum, facilities are provided for circulating cooling air through its interior.

The peripheral portion of the turret comprises an annular shelf for the support of a circular row of hollow mold adaptors which are accurately and equally spaced from one another on such shelf through the medium of mold pilot pins passing through bushings in the centers of the bottom walls of the adaptors. As will be understood, the adaptors are so located as to be centered on the center line of the pressing station when indexed thereat. The molds rest on the top wall surfaces of such adaptors which accordingly are subjected to heat transmitted to them by the molds both from radiation and conduction and therefore are subject to expansion. However, because of the manner of support of the adaptors, they are free to expand radially about their centering bushings, thus preventing their axial displacement as they expand.

The turret is adapted to be driven through the medium of the usual driving-locking slots in the under side of the shelf, except that radially extending rectangular slots replace usual circular ones, and the drive and lock pins are square, rather than the usual circular ones, to permit freedom of radial relative movement between the pins and turret while retaining the tangential fit between the pins and the turret slot.

The shelf is provided with an under side surface which rides in close proximity to a pressing anvil at the pressing station, and at the pressing station a clamp is provided to bring the shelf into intimate contact with the anvil.

A preferred embodiment of the invention is illustrated in the accompanying drawings wherein:

FIG. 1 is a plan view of a turret embodying the invention.

FIG. 2 comprises a sectional elevation taken on line 2—2 of FIG. 1.

Referring to the drawings in detail, a heat shield 41 is spaced from another heat shield 40 on the turret top surfaces at two levels between capped pins such as 49. Cooling air is supplied to the cavity of each adaptor, such as 25, and over the bottom surface of a mold occupying such adaptor via an adjacent chamber 21 which in turn receives its cooling air from the adjacent chamber 20. Cooling air is also passed through the space between plates 40 and 41 from chamber 20 via a passage such as 44 and issues to atmosphere via a passage such as 45.

The turret has embodied therein inner and outer annular rows of chambers such as 20 and 21. The outer periphery of the turret comprises a mold adaptor support shelf 22 for accommodating a circular row of mold adaptors such as 25 thereabout. Such adaptors are spaced slightly outward from the turret wall 26 comprising the outer wall of the annular chambers such as 21 with which the interior of each of the adaptors is in communication via a bushing such as 30. Each adaptor 25 is located on the shelf 22 by a bushing such as 33 located on the radial center line of the adaptor. A footed mold such as 35 has its feet 36 joined to a stepped ring 37 which seats over the top opening in an adaptor supporting it.

Chamber 20 has a top annular opening 50 closed by an air supply manifold 51 arranged about column 12 and whose outlet bordering walls contain air tight seals 55 and 56 with the top walls of chambers 20. Cooling air is supplied to manifold 51 from any suitable source via a duct 59.

For the purpose of successively indexing molds such as 35 at various stations along their circular path of travel, an arm 70 is pivoted at one end about column 12 and is reciprocatable by means of shaft 71 of fluid operated units 60 and 61 (FIG. 1) in a customary fashion. The other end of arm 70 carries a vertically reciprocatable transversely square pin 72 movable into rectangular slots such as 73 in the turret shelf to couple the arm 70 with the turret to effect its rotation and for locking it against rotation at the end of each stepping movement in a conventional fashion.

Under the turret shelf at the position at which a mold adaptor registers a mold, preparatory to conventional pressing of a charge previously deposited therein, is anvil 75, its top end terminating in close proximity to the under side of shelf 22.

Adjacent anvil 75 is an assembly 77 embodying a locking pin 76 at the free end of a piston 78 for elevating the pin 76 into the table slot such as 73 registered thereover. Pivotally supported in such assembly 77 is a rocker 80 having at one end a hold-down element 81 engageable with the top side of the shelf 22 and at the other end embodying an arm 82. A piston 83 has the free end of its rod provided with a roller 84 for rocking the arm 80 in a clockwise direction to, through its element 81, force the turret shelf 22 tightly against the anvil 75.

The supply of fluid to the cylinders occupied by pistons 78 and 83 is through a conventional form of feed valve 90 conveniently embodied in an area below the housing of assembly 77.

With the turret as designed, it will be evident that its size variations are substantially those minor ones occurring with variations in ambient temperatures, that the molds as supported are free to radially expand about their centers and, therefore, tend to retain the same radial and circumferential position with respect to the turret, even though their variation in size is at a different rate and over a wider range than occurs in the turret. Also, because of the combination of square indexing and locking pins with rectangular turret slots, radial expansion of the turret has no effect on the fit between such pins and slots. Furthermore, because of the large surface provided by rectangular indexing and locking pins, the amount of wear on the pins and turret slot defining borders is at a minimum. Also, because of the leverage arrangement of the turret hold-down apparatus and the large surface area of the anvil, assurance is had of great rigidity of the turret when an article is to be pressed.

What is claimed is:

1. A hollow bodied turret, mounted for rotation about a vertical axis, suitable for use in the conveyance of glass forming molds to various operational positions, said turret having a shelf about its periphery, mold adaptors spaced from one another in a circular row on said shelf and having centrally disposed elements anchoring them to said shelf whereby said adaptors are free to expand on said shelf radially about their elements.

2. A structure such as in claim 1 wherein each mold adaptor is hollow and its anchoring elements depend from the center of the bottom wall thereof.

3. A structure as in claim 1 wherein the turret has a cavity adjacent such shelf having a top opening and has arranged thereover vertically spaced-apart heat reflecting and insulating means between which cooling air may be passed.

4. A structure as in claim 3 in which the turret is concentrically divided into a number of chambers, one of which is annular and in the others which are in communication with the spaces between said heat reflecting and insulating means and with the interiors of said adaptors, respectively, and a cooling air supply chamber having an outlet covering an annular top opening in the annular of said chambers.

5. A structure as in claim 3 wherein the heat reflecting means comprises two separate plates which rest on different plain surfaces of said turret and are free to expand relatively thereto.

6. The combination with a turret rotatable about a vertical axis; of means adjacent one position along the circular path of travel of a peripheral portion of said turret for clamping it against rocking movement when downward pressure, as by a pressing plunger, is applied to such turret at such position; said means comprising an anvil arranged under and adjacent to the turret at such position in close proximity thereto, a hold-down device at such position pivoted about a horizontal axis having a portion projected over the turret shelf, and fluid operated means for turning said device about its pivot in a direction to exert downward pressure on said turret shelf to hold it against said anvil.

7. The combination with a turret rotatable about a vertical axis, of means for effecting its rotation in a step-by-step fashion, said means embodying a stepping arm at one end pivoted about the turret axis and terminating at its other end near the outer periphery of said turret and carrying a vertically reciprocatable stepping pin whose upper end is substantially square in cross section and registerable with a rectangular turret passage provided in said turret and whose long dimension extends radially from the turret axis, whereby a close driving fit between the pin and passage is maintained during radial dimensional changes in the turret.

8. The combination with a turret rotatable about a vertical axis and having a circular row of mold supports arranged about a peripheral portion thereof with means adapted to successively index said supports from one position to another, of an anvil arranged under and in close proximity to the turret at one of such positions, an assembly at such position embodying a fluid operated turret lock pin having access to a slot in the under side of the turret, a second fluid operated unit embodied in such assembly and a turret hold-down device at such position pivoted about a horizontal axis operable by said second unit to bring the turret into intimate contact with said anvil.

References Cited in the file of this patent

UNITED STATES PATENTS

| | | |
|---|---|---|
| 638,695 | Beeley | Dec. 12, 1899 |
| 1,690,436 | Sibson | Nov. 6, 1928 |
| 2,672,773 | Schofield | Mar. 23, 1954 |